United States Patent
Misske et al.

(10) Patent No.: US 7,371,356 B2
(45) Date of Patent: May 13, 2008

(54) METHOD FOR THE PRODUCTION OF PRECIPITATED CALCIUM CARBONATE WITH A HIGH DEGREE OF BRIGHTNESS

(75) Inventors: Andrea Misske, Speyer (DE); Reinhard Schneider, Fußgönheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 605 days.

(21) Appl. No.: 10/507,608

(22) PCT Filed: Mar. 11, 2003

(86) PCT No.: PCT/EP03/02454

§ 371 (c)(1), (2), (4) Date: Sep. 14, 2004

(87) PCT Pub. No.: WO03/076522

PCT Pub. Date: Sep. 18, 2003

(65) Prior Publication Data

US 2005/0158226 A1 Jul. 21, 2005

(30) Foreign Application Priority Data

Mar. 14, 2002 (DE) ............... 102 11 292

(51) Int. Cl.
*C01F 11/00* (2006.01)
*C01F 11/02* (2006.01)
*C01F 11/18* (2006.01)

(52) U.S. Cl. ............. 423/155; 423/432; 423/636; 423/637; 423/640

(58) Field of Classification Search ......... 423/432, 423/430, 155, 636, 637, 640
See application file for complete search history.

(56) References Cited

U.S. PATENT DOCUMENTS

| 4,900,533 A | 2/1990 | Malden |
| 2002/0172636 A1 | 11/2002 | Nover et al. |

FOREIGN PATENT DOCUMENTS

| DE | 196 29 453 | 1/1998 |
| EP | 197 327 | 10/1986 |
| JP | 94/41892 | 7/1992 |
| WO | 85/05386 | 12/1985 |
| WO | 96/20308 | 7/1996 |
| WO | 98/03725 | 1/1998 |
| WO | 99/32710 | 7/1999 |
| WO | 99/61374 | 12/1999 |
| WO | 01/17905 | 3/2001 |
| WO | 02/064505 | 8/2002 |

OTHER PUBLICATIONS

J.A.H. Oates, Lime and Limestone: Chemistry and Technology, Production and Uses; 1998, pp. 109; 352-354.
Ullmann's Encyclopedia of Industrial Chemistry, 5th Ed., vol. A25, "Sulfonic Acid and Derivatives", pp. 461-476.
Ullmann's Encyclopedia of Industrial Chemistry, 5th Ed., vol. A25 "sulfonic Acids, Aliphatic", pp. 503-506.

*Primary Examiner*—Wayne A. Langel
*Assistant Examiner*—James Fiorito
(74) *Attorney, Agent, or Firm*—Novak Druce + Quigg LLP

(57) ABSTRACT

Calcium carbonate with high brightness is prepared by treating calcium carbonate and/or the milk of lime used for its preparation by reacting milk of lime with carbon dioxide and/or at least one of the calcium-containing preliminary products used for the preparation of the milk of lime before, during and/or after this reaction with a bleaching agent which comprises at least one compound of the formula (I):

$$A[(CR^1R^2)SO_pM_{(1/q)}]_r \qquad (I)$$

where the variables have the following meanings:

| A | is $NR^3R^4$, $NR^3$, N or OH; |
| $R^1, R^2, R^3, R^4$ | independently of one another, are hydrogen or an organic radical; |
| M | is ammonium or metal |
| p | is 2 or 3; |
| q | is the valency of M; and |
| r | is 1 when A = OH or $NR^3R^4$, is 2 when A = $NR^3$ and is 3 when A = N; | and where variables, if a mixture of compounds is used and/or r=2 or 3, are chosen independently of one another for each individual compound and/or for each $[(CR^1R^2)SO_pM_{(1/q)}]$ group.

5 Claims, No Drawings

METHOD FOR THE PRODUCTION OF PRECIPITATED CALCIUM CARBONATE WITH A HIGH DEGREE OF BRIGHTNESS

The present invention relates to a process for the preparation of precipitated calcium carbonate with high brightness. Precipitated calcium carbonate (often referred to by the acronym "PCC") is an important inorganic mass-produced substance whose main field of use is use as filling and coating pigment in papermaking. PCC is also used in numerous other fields of use, for example as pigment or filler in cosmetics, plastics, paints and coatings.

In: "Lime and Limestone: Chemistry and Technology, Production and Uses", Wiley-VCH, Weinheim 1998 (ISBN 3-527-29527-5), J. A. H. Oates gives a review of the chemistry and technology of limestone, lime and its secondary products such as PCC. For the latter, the sections 12.9 (p. 109, Use) and 31.2 (p. 352-354, Production) are particularly relevant. Limestone is the collective term for natural deposits of calcium carbonate, which arises predominantly in the form of the mineral calcite. Apart from limestone, marble (hydrothermally recrystallized calcite) and chalk (calcium carbonate sediment), which can be processed like limestone for the purposes of the present invention, are also types of these deposits. Lime is the collective term for certain limestone secondary products, in particular the term includes the calcination product of limestone, burnt lime (synonyms are calx, caustic lime, quick lime; chemically the material is calcium oxide) and the reaction product of burnt lime with water, slaked lime (in solid form this is also referred to as hydrated lime, in the form of paste moistened with water as lime putty and in aqueous suspension as milk of lime, chemically the material is calcium hydroxide). Calcium is often also substituted at least partially by magnesium in limestone and its secondary products.

PCC is usually used when ground limestone (whiting) does not correspond to the profile of requirements for the given use. During the preparation of PCC, it is possible to influence, inter alia, morphology and particle size distribution of the particles and their degree of contamination in a desired manner. On an industrial scale, PCC is usually prepared by reacting milk of lime with carbon dioxide. The processes used industrially typically start from burnt lime, which is reacted with water to give milk of lime. This milk of lime is freed from particles which are too coarse and interfere with further processing, and is then reacted with a carbon dioxide-containing gas (for example pure carbon dioxide or a carbon dioxide/air mixture), in most cases in a series of reactors with precise control of the pH, of the temperature and of the degree of (super)saturation in order to establish the desired morphology and particle size distribution of the PCC. The PCC suspension prepared in this way is either used as it is or the PCC is, in most cases after excessively coarse particles have been filtered off, isolated as a solid by customary methods for separating off solids from liquids (for example filtration, centrifugation, evaporation) and drying. The particle size may, if required for a given application, be changed in a customary manner, for example by grinding or agglomeration. The process can be integrated in various ways into limestone processing (for example using the $CO_2$-containing exit gases which are formed during lime burning and/or the combustion gases from the lime burning furnace, the solid product of which is used for the preparation of milk of lime) or modified (for example by preparing milk of lime by dispersing hydrated lime in water). It is likewise possible to use calcium carbonate, calcium oxide or calcium hydroxide from sources other than limestone, for example carbide lime hydrate, a secondary product from the electrothermal calcium carbide preparation from coke and limestone.

WO 01/17905 and the specification cited therein disclose processes for the preparation of PCC.

An important quality feature of lime products is their brightness (more rarely whiteness). The brightness is measured in standardized processes, for example in accordance with DIN 5033 "Colorimetry", Part 9 (1982) and DIN 53163 "Testing of pigments and fillers" (1988) or the corresponding international standards. For this, measurement is essentially made, in a photometer, of the reflectance of light of a certain wavelength (in most cases 457 nm) compared with a white standard determined as 100% reflectance (in most cases pure barium sulfate). The brightness is reduced by the impurities present in the limestone. Typical impurities of limestone are quartz, clay minerals, feldspars, pyrite, hematite, silica rocks, phosphates and sulfates (gypsum, anhydrite), the brightness being impaired in particular by impurities which contain iron and manganese. During the preparation of PCC, the brightness increases compared with the starting material limestone, inter alia as a result of filtering off impurities which are suspended in water, not like calcium hydroxide in milk of lime. Ground limestone from comparatively pure deposits therefore typically has brightnesses in the range from 75 to 95, but PCC has brightnesses above 95.

The requirements on the brightness of PCC are high, particularly in the case of use as filler or coating composition for papermaking. For this reason, PCC is often also treated with bleaching agents.

According to the teaching of WO 96/20308, paper containing filler, in particular PCC, is treated, during the pressing operation after the actual dewatering of the pulp, with a bleaching agent chosen from hydrogen peroxide, sodium tetrahydroboranate and sodium hydrosulfite. WO 85/05386 discloses a process of bleaching pulp using hydrogen peroxide, where magnesium carbonates, and also whiting are added, although not as filler, but as basic auxiliary of the bleaching operation. WO 99/32710 teaches a similar process using a peracid as bleaching agent.

EP-A-197 327 discloses a process for the preparation of PCC in which ammonium or amine salts are added to the milk of lime, after filtration of the milk of lime, activated carbon is added, which is then likewise filtered off again, and then the PCC is precipitated by introducing carbon dioxide. WO 99/61374 teaches a process for the preparation of PCC where a suspension auxiliary is added to the precipitated PCC which establishes a positive zeta potential of the PCC at a pH of less than 9, for example a carboxylic acid. During the precipitation of the PCC, it is possible to add an auxiliary chosen from the group formed by hydrazine, hydroxyamine, soluble salts of hydroxyamine, soluble dithionite salts and mixtures thereof.

However, it is also known to treat PCC with reducing bleaching agents. Such bleaching agents primarily convert the undesired iron and manganese compounds into soluble iron and manganese salts. Thus, WO 99/61374 teaches a process for the preparation of PCC in which sodium dithionite is added to the milk of lime prior to precipitation. (Dithionites are often also referred to as hydrosulfites.) U.S. Pat. No. 4,900,533 discloses the precipitation of PCC in the alkaline pH range in the presence of sodium dithionite or zinc dithionite in an amount of from 0.45 to 9 kg per ton of PCC. This process has the disadvantage that these dithionites are unstable compounds which are only stable upon storage to a limited degree and which are entirely capable of self igniting, particularly when they come into contact with moisture, and are therefore difficult to handle. Furthermore, their thermal sensitivity limits the applicable temperature range. U.S. Pat. No. 4,900,533 explicitly limits the temperature to be used in the process disclosed therein to a maximum of 45° C. due to decomposition of the dithionites at higher temperatures. Although WO 99/61374 discloses in general maximum temperatures up to 100° C., the actual operating temperature used therein is 40° C. This temperature limitation necessitated by the instability of the dithionites prolongs the required reaction time and also makes bleaching during precipitation of the PCC impossible since temperatures significantly above 50° C. typically arise as a result of the exothermic nature of the precipitation, unless, something which is disadvantageous from an economic point of view, use is made of cooling devices.

JP-A-94/41 892 discloses a process for the bleaching of precipitated PCC or, in particular, calcium carbonate from the caustification of soda in which the PCC or calcium carbonate is treated in an alkaline medium with sodium or zinc dithionite, sodium tetrahydroboranate, sodium sulfite, sodium hydrogensulfite thiourea dioxide(synonym: formamidinesulfinic acid) or Rongalit (not specified in any more detail). Rongalit® is a trade mark of BASF Aktiengesellschaft and serves as a collective term for designating various sulfinic acid derivatives which are differentiated by the further designation which follows the name. The products sold under the trade name Rongalit are used in particular in textile dyeing and textile printing. For example, Rongalit C is sodium hydroxymethanesulfinate dihydrate, Rongalit H is calcium hydroxymethanesulfinate, further products sold under this trade name are or were, for example, Rongalit ST, Rongalit DP, Rongalit DS, Rongalit 2 PH-A, Rongalit 2 PH-B, Rongalit CL, Rongalit CW, Rongalit BA and Rongalit FD (this list is not necessarily complete; the alkanesulfonates/-sulfinates are often also referred to as alkylsulfonates/-sulfinates, for example sodium hydroxymethanesulfonate is thus also referred to as sodium hydroxymethylsulfonate). Like in U.S. Pat. No. 4,900,533 and WO 99/61374, according to the teaching of JP-A-94/41 892, sodium dithionite is used at 40° C.; alternatively, thiourea dioxide, which as is known can be used at a significantly higher temperature, is used at 80° C. However, due to the admittedly in most cases low, but in practice often unavoidable, residual content of thiourea, which is a substance with well-founded suspicion of carcinogenic potential, the use of thiourea dioxide for the bleaching encounters considerable opposition.

WO 98/03725 discloses, inter alia, compounds which can be described by the following formula:

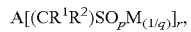

where the variables have the following meanings

| A | is $NR^3R^4$, $NR^3$, N or OH; |
|---|---|
| $R^1, R^2, R^3, R^4$, | independently of one another, are hydrogen or an organic radical; |
| M | is ammonium or metal |
| p | is 2 or 3; |
| q | is the valency of M; and |
| r | is 1 when A = OH or $NR^3R^4$, is 2 when A = $NR^3$ and is 3 when A = N; | and where these variables, if a mixture of compounds is used and/or r=2 or 3, are chosen independently of one another for each individual compound and/or each $[(CR^1R^2)SO_pM_{(1/q)}]$ group, and also the preparation of such compounds and their use for reductive aftercleaning during the dyeing of textiles containing polyester.

It is an object of the invention to find further simple and cost-effective processes for the preparation of calcium carbonate with the highest brightness. We have found that this object is achieved by a process for the preparation of calcium carbonate with high brightness by reductive bleaching by means of at least one sulfinic and/or sulfonic acid derivative, which comprises treating calcium carbonate and/or the milk of lime used for its preparation by reacting milk of lime with carbon dioxide, and/or at least one of the calcium-containing preliminary products used for the preparation of the milk of lime before, during and/or after this reaction with a bleaching agent which comprises at least one compound of the formula (I):

$$A[(CR^1R^2)SO_pM_{(1/q)}]_r \qquad (I)$$

where the variables have the following meanings:

| A | is $NR^3R^4$, $NR^3$, N or OH; |
|---|---|
| $R^1, R^2, R^3, R^4$ | independently of one another, are hydrogen or an organic radical; |
| M | is ammonium or metal |
| p | is 2 or 3; |
| q | is the valency of M; and |
| r | is 1 when A = OH or $NR^3R^4$, is 2 when A = $NR^3$ and is 3 when A = N; | and where variables, if a mixture of compounds is used and/or r=2 or 3, are chosen independently of one another for each individual compound and/or for each $[(CR^1R^2)SO_pM_{(1/q)}]$ group.

Surprisingly, bleaching with these sulfinic acid derivatives leads to significantly better brightnesses than can be achieved with hydrosulfite bleaching. Also, using the process according to the invention, the use of greater amounts of sulfinic acid derivative results in a greater brightness, in contrast to hydrosulfite bleaching in which higher amounts of bleaching agent no longer lead to a further increase in brightness. In addition, with the process according to the invention, it is possible to work at relatively high temperatures without decomposition of the bleaching agent, which increases the reaction rate of the bleaching and thus the space-time yield.

Compounds and compound mixtures of the formula (I) and their preparation are known. They are described, for example, in Ullmann's Encyclopedia of Industrial Chemistry, 5th Edition, Volume A 25, VCH Verlagsgesellschaft mbH (in the interim: Wiley-VCH Verlag GmbH), Weinheim 1994 (ISBN 3-527-20100-9), keywords "sulfinic acid and derivatives" (pages 461-476) and "sulfonic acids, aliphatic" (pages 503-506), in WO 98/03725, and the literature cited in these references, to the entire contents of which express reference is hereby made.

The compounds of the formula (I) are, when p=2, derivatives of sulfinic acid and, when p=3, derivatives of sulfonic acid. If two or three $[(CR^1R^2)SO_pM_{(1/q)}]$ groups are bonded to a central nitrogen atom (A=$NR^3$, N), and the degree of oxidation of the sulfur in these groups is different (i.e. p is not identical for the individual $(CR^1R^2)SO_pM_{(1/q)}$ groups in the molecule), mixed sulfinates/sulfonates are present.

In formula (I), A is $NR^3R^4$, $NR^3$, N or OH. If A=OH and accordingly r=1 then the compounds of the formula (I) are hydroxymethanesulfinates or -sulfonates. If $A=NR^3R^4$ and accordingly r=1, the compounds of the formula (I) are usually referred to as aminomethanesulfinates/-sulfonates, if $A=NR^3$ and correspondingly r=2, as iminomethanesulfinates/-sulfonates, and if $A=N$ and accordingly r=3, as nitrilomethanesulfinates/-sulfonates.

$R^1$, $R^2$, $R^3$ and $R^4$, independently of one another, are hydrogen or an organic radical. A suitable organic radical is any radical inert under the reaction conditions of the process according to the invention. Examples of suitable organic radicals are aliphatic, cycloaliphatic, aromatic, arylaliphatic or heteroaromatic radicals, such as alkyl, alkenyl, alkynyl, cycloalkyl, cycloalkenyl, aryl, such as phenyl, alkylaryl or arylalkyl. The radicals may be substituted by further organic radicals and also include heteroatoms, for example in the form of alkoxy substituents, ester groups, amino or alkylamino functions. The heteroatoms, such as oxygen, sulfur or nitrogen, may also be part of an aromatic or cyclic radical. The radicals can also be linked with one another and [lacuna] parts of single- or multi-numbered, mono- or polycyclic ring systems, for example having 4 to 16 carbon atoms, which include the incorporated radicals $R^1$ and $R^2$ and the carbon atom of the $[(CR^1R^2)SO_pM_{(1/q)}]$ group in question and/or the incorporated radicals $R^3$ and $R^4$ and the N atom of the $NR^3R^4$ group in question. Examples of suitable organic radicals R are $C_1$-$C_{20}$-alkyl radicals, in particular $C_1$-$C_6$-alkyl radicals, and $C_3$-$C_8$-cycloalkyl radicals, where these (cyclo)alkyl radicals may be substituted by one to three $C_1$-$C_4$-alkyl radicals, such as methyl, ethyl, 1-propyl, 2-propyl, 1-butyl, 2-butyl, 1-(2-methyl)propyl, 1-(1,1-dimethyl)ethyl, or correspondingly linear or branched pentyl, hexyl or longer-chain radicals, such as, for example, eicosyl, or cyclopropyl, cyclobutyl, cyclopentyl, cyclohexyl, cycloheptyl, cyclooctyl radicals, which may, if desired, also be substituted by alkyl radicals. In a preferred manner, the radicals $R^1$, $R^2$, $R^3$ and $R^4$ are hydrogen or $C_1$-$C_4$-alkyl, in particular methyl or ethyl.

M is ammonium or metal of valence q. Ammonium is $R^1R^2R^3R^4N$, where the above definitions apply for the radicals R. Ammonium is preferably $NH_4^+$. Suitable metals are in principle any metal which forms stable sulfinate or sulfonate salts. In particular, the metals used are the alkali metals Li, Na, K, Rb and/or Cs, the alkaline earth metals Mg, Ca, Sr and/or Ba and/or Zn. Preferred metals are Na, Ca and Zn.

q is the valence, i.e. the ionic charge of the metal present naturally in the form of a cation in the compounds of the formula (I), or of ammonium. For ammonium and the alkali metals, q=1, for the alkaline earth metals and zinc, q=2. If other metals are used, q may also be higher. If metals of different valence are used in a mixture, q is to be inserted specifically into the formula (I) for the metal in question. The charge balance—each $(CR^1R^2)SO_p$ group naturally carries a single negative charge—can, if q is not 1, take place intramolecularly within a molecule according to the formula (I), such as, for example, in $N[(CH_2)SO_2]_3NaCa$, but also intermolecularly between two or more molecules according to the formula (I), in the latter case two or more molecules according to the formula $A[(CR^1R^2)SO_pM_{(1/q)}]_r$ share an actual metal ion, as, for example, in $[N(CH_2SO_2)_3]_2Ca_3$. The first-mentioned example compound here corresponds to the general formula (I) as $N[(CH_2)SO_2(Na_{1/1}Ca_{1/2})]_3$, and the second-mentioned compound corresponds to the formula (I) as $N[(CH_2)SO_2Ca_{(1/2)}]_3$.

The variable p is 2 or 3. If p=2, it is a sulfinate or a sulfinate group, and if p=3, it is a sulfonate or a sulfonate group.

In industry, such compounds are prepared easily in a known manner by reacting dithionite $S_2O_4M_{2/q}$ or hydrogensulfites $HSO_3M_{1/q}$ with ketones $R^1$—CO—$R^2$ or aldehydes ($R^1$—CO—H or formaldehyde, $R^1$=$R^2$=H). In this process, hydroxymethanesulfonates and -sulfinates according to the formula (I) and specifically according to the formula HO—$CR^1R^2$—$SO_pM_{1/q}$ are formed. These sulfonates and sulfinates are, if desired, then reacted with ammonia, primary amines $R^3NH_2$ or secondary amines $R^3R^4NH$. This reaction produces, with the elimination of water, condensation products of the formula (I) in which the hydrogen atom(s) on the ammonia or amine nitrogen is/are completely or partially replaced by —$CR^1R^2$—$SO_pM_{1/q}$ groups. The stoichiometry of the feed substances predetermined during the preparation and the simultaneous addition or observance of an order of addition determine, in a quite obvious manner, the ultimate compounds and the ultimate compound mixture. The content of sulfinate and sulfonate groups can be readily determined analytically, for example by redox titration. Typical reaction conditions are a temperature of generally at least 20° C., preferably at least 40° C. and generally at most 100° C., preferably at most 90° C., and a reaction time of generally at least 15 minutes, preferably at least 30 minutes and generally at most 10 hours, preferably at most 6 hours, and an aqueous reaction medium. The reaction pressure applied is not important, and atmospheric pressure is generally used.

The sulfinates can also be obtained by reduction of the corresponding sulfonates, for example by catalytic reduction of the sulfonates with hydrogen or by reaction thereof by means of zinc dust. The partial reduction of sulfonates is a further method for the preparation of mixed sulfonates/sulfinates.

For some compounds of the formula (I), further special preparation processes are known. Thus, for example, sodium hydroxymethanesulfinate HO—$CH_2$—$SO_2Na$ is usually prepared by reacting sulfonyl chloride with sodium amalgam or sodium formate. Sodium hydroxymethanesulfinate, which is normally in the form of the dihydrate, is also a common commercial product and is available, for example, under the name Rongalit® C from BASF Aktiengesellschaft, Ludwigshafen, Germany, or in various commercial forms under the name Brüggolit® from L. Brüggemann KG, Heilbronn, Germany.

It is entirely possible to prepare the compound(s) of the formula (I) only in situ, i.e. in the presence of the PCC, the milk of lime or the calcium-containing feed substances used for their preparation.

Compounds or compound mixtures of the formula (I) preferred for the process according to the invention are i) sodium hydroxymethanesulfinate and ii) the mixture of nitrilomethanesulfinate/-sulfonates produced during the reaction of three equivalents of a sodium hydroxymethanesulfinate/-sulfonate mixture with ammonia.

The bleach to be used in the process according to the invention comprises at least one compound of the formula (I). Further components can be added to the bleach, for example fillers and/or auxiliaries, such as, for example, drying agents, buffer substances, antidust agents, fragrances for masking unpleasant odors, stabilizers and the like. Such additives are known for reducing agents based on sulfinate and sulfonate from the technology of textile dyeing and can also be used here. In particular, in the case of the treatment according to the invention of calcium carbonate with a bleaching agent, it may be advantageous to add a complexing agent to the bleaching agent. In this connection, preference is given primarily to citric acid and/or oxalic acid and/or their salts, in particular their alkali metal and/or alkaline earth metal salts, for example their sodium, potassium, magnesium and/or calcium salts. Although an addition of dithionite is possible in theory, it brings the abovementioned disadvantages of the PCC bleaching with dithionite and is therefore avoided in the normal case. It is, however, also possible to add a pure compound of the formula (I) or a mixture of compounds of the formula (I) as bleaching agent, and in this case the bleaching agent thus consists of one or more compounds of the formula (I). It is likewise possible to use as bleaching agent a mixture which, in addition to one or more compounds of the formula (I), comprises only unavoidable impurities and/or components which have been deliberately added to an immaterial extent, such as, for example, auxiliaries. In this case, the bleaching agent thus consists essentially of one or more compounds of the formula (I).

In the process according to the invention, calcium carbonate and/or the milk of lime used for its preparation by reacting milk of lime with carbon dioxide, and/or at least one of the calcium-containing preliminary products used for the preparation of the milk of lime is treated before, during and/or after its reaction with a bleaching agent which comprises at least one compound of the formula (I), thereby being reductively bleached. (In the text below "bleaching agent" is to be understood as meaning a bleaching agent which comprises at least one compound of the formula (I).) For example, calcium carbonate (natural or synthetically prepared calcium carbonate such as PCC), burnt lime or milk of lime is treated with bleaching agent. In the solid state (in the case of calcium carbonate or burnt lime), the bleach is used in dry form, for example by mixing with the solid to be bleached or by common grinding. In the liquid state (calcium carbonate suspension or milk of lime), the bleaching agent is usually added to the suspension and/or to the suspending agent. The bleaching agent can, however, also be added to the solid, which is then suspended, or in the case of burnt lime, slaked. In the case of burnt lime, although bleaching in a suspension in an inert (therefore necessarily nonaqueous) suspending agent (for example hydrocarbons) is possible, it is generally economically uninteresting.

In a preferred embodiment of the process according to the invention, calcium carbonate is treated with bleaching agent. The origin of the calcium carbonate and its purity are unimportant. For example, ground limestone, marble, chalk or PCC is used. In the process according to the invention, as in the processing of calcium carbonate, it is expedient and generally customary to initially establish the particle size desired for the given application of the calcium carbonate by grinding, unless the crude product used is already of this size. If a grinding step is necessary, the calcium carbonate is treated with bleaching agent before, during or after this grinding step. In most cases, the treatment of the calcium carbonate with bleaching agent before a necessary grinding step is inappropriate since in most cases a lesser increase in the brightness is obtained for the finished product than if the calcium carbonate is treated before or after the grinding step. It is therefore preferable, if a grinding step is necessary, to add the bleaching agent during the grinding step, otherwise the calcium carbonate is treated directly with bleaching agent. For this, the calcium carbonate can be ground or mixed in the dry state with the bleaching agent, although preference is given to treating a suspension of the calcium carbonate with bleaching agent. The suspending agent used is a liquid, preferably water. If a grinding step is necessary, it is easier to carry it out as a wet grinding step and to add bleaching agent during the wet grinding step.

In another preferred embodiment of the process according to the invention, the reductive bleaching is combined with the preparation of calcium carbonate, in particular the precipitation of PCC by reaction of milk of lime with carbon dioxide. For this purpose, bleaching agent is added to the reaction mixture before, during and/or after the introduction of a carbon dioxide-containing gas into milk of lime. For example, bleaching agent is added to the milk of lime prior to the introduction of a carbon dioxide-containing gas. Preferably, some of the bleaching agent is added to the milk of lime prior to the introduction of carbon dioxide, and a further part of the bleaching agent is added to the reaction product following precipitation of the PCC. In this embodiment, it is necessary to work in suspension since both the milk of lime and also the reaction mixture are suspensions during and after the introduction of carbon dioxide. The suspending agent is a liquid, preferably water.

The solids content of the suspension is chosen in both embodiments out of cost considerations such that it is neither necessary to circulate unnecessarily high amounts of liquid, nor to treat a paste which can only be stirred and conveyed with very great difficulty. Typical solids contents of the suspensions are in the range from at least 3% by weight of calcium carbonate, based on the total mass of the suspension, preferably at least 5% by weight and, in a particularly preferred manner, at least 10% by weight, and generally at most 90% by weight, preferably at most 50% by weight and in a particularly preferred manner at most 20% by weight. The solids content of the milk of lime used in the process according to the invention combined with the PCC preparation is correspondingly chosen so that said calcium carbonate solids contents are achieved after the reaction.

In the case of the treatment of the calcium carbonate or of the milk of lime with bleaching agents, excessively low pH values are normally disadvantageous since calcium carbonate decomposes in the acidic range with the evolution of carbon dioxide. Generally, in the case of the treatment of already precipitated PCC, a pH of at least 5, preferably at least 6 and not more than 9, preferably not more than 8, is established. In the case of PCC precipitation, the initial pH of the milk of lime is strongly basic and drops over the course of the precipitation. The bleaching before or during the PCC precipitation therefore takes place at the pH present in the precipitation mixture.

It is possible to work at a low temperature; the temperature is generally more than 10° C. or preferably more than 20° C. Typically, however, the reaction rate here is also low, which reduces the space-time yield. In a particularly preferred manner, the temperature is therefore at least 50° C. It is also generally at most 95° C. and preferably at most 90° C. It may be advantageous to add a complexing agent to the suspension if one was not present in the bleaching agent used. If this procedure is used, preferred complexing agents are citric acid and/or oxalic acid and/or their salts, in particular their alkali metal and/or alkaline earth metal salts, for example their sodium, potassium, magnesium and/or calcium salts. With the exception of the bleaching temperature, which tends to be higher, and the use of the bleaching agent according to the invention, all of these are also customary parameters and measures for the industrially common PCC preparation or for the known hydrosulfite bleaching of calcium carbonate.

The concentration of bleaching agent used according to the invention and the treatment time are chosen so that the desired increase in the brightness is achieved, without unnecessarily high amounts of bleaching agent being consumed or an unnecessarily large amount of time being lost.

In general, bleaching agent is added in an amount such that at least 0.1 gram of compound of the formula (I) or mixture of compounds of the formula (I) are used per kilogram of calcium carbonate, preferably at least 0.5 g/kg and in a particularly preferred manner at least 0.7 g/kg, and generally at most 200 g/kg, preferably at most 150 g/kg and in a particularly preferred manner at most 100 g/kg. A decisive aspect in this respect is the content of sulfinate groups in the bleaching agent. For a bleaching agent which has a lower relative proportion of sulfinate groups, the amount to be used is accordingly greater than for a bleaching agent with a higher relative proportion of sulfinate groups. The treatment time is generally at least 15 minutes, preferably at least 30 minutes and in a particularly preferred manner at least one hour and generally at most 10 hours, preferably at most 8 hours and in a particular preferred manner at most 6 hours. In the embodiment in which the process according to the invention is combined with the precipitation of PCC, it is usually not necessary to add these reaction times to the typical reaction times for the PCC preparation. It suffices to choose a total reaction time of PCC precipitation and bleaching which is sufficiently long.

If the bleaching agent is added in the process according to the invention combined with the PCC preparation at two or more time intervals, the amount of bleaching agent used overall is divided into a number of portions which are added at these different time intervals. For example, part of the total amount of sulfinic acid derivative is added to milk of lime at a temperature of at least 10° C., preferably at least 20° C. and at most 90° C., preferably at most 50° C., then a carbon dioxide-containing gas is introduced, thereby precipitating PCC. The partial amount of bleaching agent used here is an arbitrary partial amount of the overall amount of bleaching agent. It is usually generally at least 10% by weight of the total amount of bleaching agent, preferably at least 20% by weight and in a particularly preferred manner at least 30% by weight, and generally at most 90% by weight, preferably at most 80% by weight and in a particularly preferred manner at most 70% by weight. For example, 50% by weight of the total amount of bleaching agent are added to the milk of lime before introducing a carbon dioxide-containing gas. The remaining bleaching agent is added after the introduction of gas is complete. It is, however, likewise possible to add the total amount of bleaching agent in three parts before, during and after the introduction of gas, and a division into more than three portions and also a continuous addition of bleaching agent are likewise possible.

EXAMPLES

In accordance with the procedures (a), (b) and (c) described below, (a) unbleached PCC from Schaefer Kalk KG, Diez, Germany (the product which is commercially available in bleached form as PRECARB® 100) with an initial brightness of 94.20 was treated with the bleaching agent to be used in accordance with the invention, (b) PCC was prepared by introducing a carbon dioxide-containing gas into a milk of lime treated beforehand with bleaching agent, and (c) PCC was freshly prepared from milk of lime by reaction with carbon dioxide and then treated with bleaching agent.

All of the brightness measurements were carried out on samples pulverized in a mortar in accordance with a modification of DIN 53145 in which measurements were made not on compacts, as specified therein, but on unpressed powder. The brightnesses measured are therefore too low compared with brightnesses measured on compacts.

The experiments were carried out on the one hand with the mixture of nitrilomethanesulfinate/-sulfonates ("mixture", Experiments 1-12) formed in the reaction of three equivalents of a sodium hydroxymethanesulfinate/-sulfonate mixture with ammonia, and on the other hand with sodium hydroxymethanesulfinate ("Rongalit C", Experiments 13-27). The Comparative Experiments C1-C12 were carried out with sodium hydrosulfite ("hydrosulfite") as bleaching agent.

The procedures were:

Procedure (a): 100 g of a PCC slurry in water (15% by weight of PCC) are treated at 60° C. with the bleaching agent and stirred. After 4 hours, the solid is filtered off and dried.

Procedure (b): 100 g of milk of lime (11% by weight of calcium hydroxide in water) are treated, with stirring, with the bleaching agent, then a $CO_2$/air mixture [50% by volume of $CO_2$, 40 l/h] is introduced, the temperature increasing slowly over 1 h from the starting value 30° C. to 65° C. After a further 1 hour at 65° C., the solid is filtered off and dried.

Procedure (c): A $CO_2$/air mixture (50% by volume of $CO_2$, 40 l/h] is then introduced into 100 g of milk of lime (11% by weight of calcium hydroxide in water), during which the temperature is slowly increased over 1 h from the starting value 30° C. to 65° C. The mixture is then treated, with stirring, with the bleaching agent. After a further 1 hour at 65° C., the solid is filtered off and dried.

The bleaching agent concentrations used are given in Table 1, in each case in grams of bleaching agent used per 100 g of calcium carbonate. The amounts used were chosen so that, at a given concentration c1, c2, c3, c4 or c5, identical molar equivalents of sulfinate (i.e. reducing-active molecules or groups) are present in the bleaching agents used.

TABLE 1

| Concentration | Hydrosulfite | Mixture | Rongalit C |
|---|---|---|---|
| c1 | 0.37 | 0.97 | 1.24 |
| c2 | 0.74 | 1.95 | 2.48 |
| c3 | 1.11 | 2.93 | 3.6 |
| c4 | 1.48 | 3.66 | 4.96 |
| c5 | 2.22 | 5.84 | 7.44 |

Parameters and results of Examples 1-27 and Comparative Examples C1-C12 are summarized in Table 2 below. "n.d." means: "not determined":

TABLE 2

| (Comparative) Example No. | Procedure | Bleaching agent | Conc. | Brightness |
|---|---|---|---|---|
| C1 | a | Hydrosulfite | c1 | 95.4 |
| C2 | b | Hydrosulfite | c1 | 95.3 |
| C3 | c | Hydrosulfite | c1 | 95.7 |
| C4 | a | Hydrosulfite | c2 | 95.3 |
| C5 | b | Hydrosulfite | c2 | 94.8 |
| C6 | c | Hydrosulfite | c2 | 96.0 |
| C7 | a | Hydrosulfite | c4 | 95.0 |
| C8 | b | Hydrosulfite | c4 | 95.7 |
| C9 | c | Hydrosulfite | c4 | 95.8 |
| C10 | a | Hydrosulfite | c5 | 95.0 |
| C11 | b | Hydrosulfite | c5 | 95.7 |
| C12 | c | Hydrosulfite | c5 | 95.9 |
| 1 | a | Mixture | c1 | 90.7 |
| 2 | b | Mixture | c1 | 95.6 |
| 3 | c | Mixture | c1 | 96.1 |

TABLE 2-continued

| (Comparative) Example No. | Procedure | Bleaching agent | Conc. | Brightness |
|---|---|---|---|---|
| 4 | a | Mixture | c2 | 91.0 |
| 5 | b | Mixture | c2 | 95.7 |
| 6 | c | Mixture | c2 | 96.7 |
| 7 | a | Mixture | c4 | 92.2 |
| 8 | b | Mixture | c4 | 95.2 |
| 9 | c | Mixture | c4 | 95.8 |
| 10 | a | Mixture | c5 | 93.7 |
| 11 | b | Mixture | c5 | 95.4 |
| 12 | c | Mixture | c5 | 96.8 |
| 13 | a | Rongalit C | c1 | 91.4 |
| 14 | b | Rongalit C | c1 | 96.0 |
| 15 | c | Rongalit C | c1 | 96.6 |
| 16 | a | Rongalit C | c2 | 91.8 |
| 17 | b | Rongalit C | c2 | 96.7 |
| 18 | c | Rongalit C | c2 | 96.5 |
| 19 | a | Rongalit C | c3 | n.d. |
| 20 | b | Rongalit C | c3 | 95.8 |
| 21 | c | Rongalit C | c3 | 97.0 |
| 22 | a | Rongalit C | c4 | 95.8 |
| 23 | b | Rongalit C | c4 | 96.5 |
| 24 | c | Rongalit C | c4 | 97.0 |
| 25 | a | Rongalit C | c5 | 95.4 |
| 26 | b | Rongalit C | c5 | n.d. |
| 27 | c | Rongalit C | c5 | n.d. |

The examples show that in the case of the bleaching of PCC (examples using procedure (a)) with the process according to the invention, the brightness of the PCC can, in contrast to the prior art (hydrosulfite) be increased by higher concentrations of the bleaching agent, and in the case of higher concentrations, the process according to the invention (in particular in the case of the use of Rongalit C) leads to significantly better brightnesses of the PCC than the prior art. The examples also show that in the case of the addition of bleaching agent to the milk of lime prior to precipitation of the PCC (examples using procedure (b)) using the process according to the invention, significant increases in the brightness are achieved compared with the prior art (bleaching of the PCC with hydrosulfite). They also show that also in the case of freshly precipitated PCC (examples using procedure (c)), the process according to the invention leads to greater brightnesses than the prior art.

We claim:

1. A process for the preparation of calcium carbonate with high brightness by reductive bleaching by means of one sulfinic and/or sulfonic acid derivative, which comprises treating calcium carbonate and/or the milk of lime used for its preparation by reacting milk of lime with carbon dioxide, and/or at least one of the calcium-containing preliminary products used for the preparation of the milk of lime before, during and/or after this reaction with a bleaching agent which comprises at least one compound of the formula (I):

$$A[(CR^1R^2)SO_pM_{(1/q)}]_r \qquad (I)$$

where the variables have the following meanings:

| A | is $NR^3R^4$, $NR^3$, N or OH; |
|---|---|
| $R^1, R^2, R^3, R^4$, | independently of one another, are hydrogen or an organic radical; |
| M | is ammonium or metal |
| p | is 2 or 3; |
| q | is the valency of M; and |
| r | is 1 when A = OH or $NR^3R^4$, is 2 when A = $NR^3$ and is 3 when A = N;. | and where variables, if a mixture of compounds is used and/or r=2 or 3, are chosen independently of one another for each individual compound and/or for each $[(CR^1R^2)SO_pM_{(1/q)}]$ group.

2. A process as claimed in claim 1, wherein the bleaching agent is added to the milk of lime prior to its reaction with carbon dioxide.

3. A process as claimed in claim 2, wherein bleaching agents are added both to the milk of lime prior to its reaction with carbon dioxide, and also to the calcium carbonate suspension prepared by the reaction of milk of lime with carbon dioxide.

4. A process as claimed in claim 1, wherein the amount of bleaching agent added is such that at least 0.1 gram of compound or mixture of compounds of the formula (I) are used per kilogram of calcium carbonate.

5. A process as claimed in claim 1, wherein the treatment with bleaching agent is carried out at a temperature in the range from at least 50 to at most 90° C.

* * * * *

UNITED STATES PATENT AND TRADEMARK OFFICE
CERTIFICATE OF CORRECTION

PATENT NO. : 7,371,356 B2 Page 1 of 1
APPLICATION NO. : 10/507608
DATED : May 13, 2008
INVENTOR(S) : Misske et al.

It is certified that error appears in the above-identified patent and that said Letters Patent is hereby corrected as shown below:

In Claim 1, col. 12, indicated line 22:
"when A = N;." should read --when A = N;--

Signed and Sealed this

Twenty-ninth Day of July, 2008

JON W. DUDAS
*Director of the United States Patent and Trademark Office*